United States Patent Office 3,328,911
Patented July 4, 1967

3,328,911
MUSHROOM PRODUCTION
Barbara A. Bennett, % Commercial Solvents Corporation,
Terre Haute, Ind. 47808
No Drawing. Filed Apr. 29, 1966, Ser. No. 546,206
8 Claims. (Cl. 47—1.1)

The present invention relates to an improved process for the growth and production of mushroom tissue. In a particular aspect this invention relates to an improved process for the growth and production of mushroom tissue by cultivation of mushroom tissue under sterile conditions in an aqueous nutrient fermentation medium wherein the mushroom tissue is treated with an aqueous solution of an oxidizing agent selected from the group consisting of sodium hypochlorite and hydrogen peroxide to sterilize the mushroom tissue against contaminating microorganisms.

Edible mushrooms find a variety of food uses. The caps and stems of mushrooms are considered a delicacy by gourmets. Mushrooms in dried and/or powdered form are used to impart the distinctive mushroom flavor to foodstuffs.

A limited number of species of edible mushrooms, in particular those of the genus Agaricus, can be grown commercially in soil or in composts prepared from stable manure. Other desirable species of edible mushrooms, in particular those of the genus Morchella, more commonly referred to as the "morel" variety of mushrooms, are obtained commercially only by fermentation in an aqueous nutrient fermentation medium of the live mushroom tissue. Dried and/or powdered mushroom preparations are readily prepared from the mushroom products from such fermentations. References concerning the production of mushroom tissue by fermentation are U.S. Patent 2,761,246 to J. Szuecs, issued Sept. 4, 1956 and the article by Sugihara et al. in Applied Microbiology, vol. 2, No. 3, 170-172 (May 1954).

The practice of the art in the growth and production of mushroom tissue by fermentation is to conduct the cultivation of the mushroom tissue under sterile conditions in order to avoid contamination of the fermentation medium by unwanted microorganisms, such as bacteria or yeasts. The presence of contaminating microorganisms in the fermentation medium adversely affects the growth and production of mushroom tissue. Therefore, it is common practice to sterilize the aqueous nutrient fermentation medium prior to inoculation of the medium with the culture of mushroom tissue. To avoid contamination of the fermentation medium during inoculation it is also an accepted practice to use as inoculum only the naturally sterile "inner tissue" of the mushroom, since the outer exposed tissue is typically contaminated with unwanted microorganisms. The naturally sterile inner tissue of the mushroom is obtained by breaking or cutting the mushroom and mechanically extracting the inner tissue. The extraction procedure is a difficult, time-consuming and expensive task which must be carefully performed under aseptic conditions. Even when this difficult procedure is carried out under the most exacting conditions, contamination of the fermentation medium is not always avoided.

It is an object of the present invention to provide an improved process for the growth and production of mushroom tissue.

It is a further object of the present invention to provide an improved process for the growth and production of mushroom tissue by the cultivation of mushroom tissue under sterile conditions in an aqueous nutrient fermentation medium.

Other objects and advantages of the present invention will be apparent from the specification and appended claims.

The objects and advantages of the present invention are attained by treating mushroom tissue with an aqueous solution of an oxidizing agent selected from the group consisting of sodium hypochlorite and hydrogen peroxide to sterilize the mushroom tissue against contaminating microorganisms. The thus sterilized mushroom tissue is then cultivated in an aqueous fermentation medium under sterile conditions to grow and produce mushroom tissue.

In carrying out the process of the present invention, mushroom tissue in the form of the whole mushroom or in the form of pieces, slices or sections of mushrooms is treated with an aqueous solution of an oxidizing agent selected from the group consisting of sodium hypochlorite and hydrogen peroxide. The treatment may be carried out in any suitable manner. For example, the mushroom tissue may be dipped in or washed with the aqueous solution of oxidizing agent.

The concentration of the oxidizing agent in the aqueous solution is an important feature of the present invention. The concentration of the oxidizing agent must be sufficient to sterilize the mushroom tissue but limited in order to avoid substantial destruction of the mushroom tissue. Generally, concentrations of sodium hypochlorite in the range of from about 3 to about 6% by weight and concentrations of hydrogen peroxide in the range of from about 3 to about 10% by weight, the weights based on the aqueous solution, are preferred.

The treatment time or time of contact of the mushroom tissue with the aqueous solution of oxidizing agent is also an important feature of the present invention. The mushroom tissue must be contacted with the aqueous solution of oxidizing agent for a period of time sufficient to sterilize the mushroom tissue but limited to avoid substantial destruction of the mushroom tissue. Generally, a treatment time in the range of from about 30 to about 60 seconds is preferred.

Mushroom tissue treated in accordance with the present invention is then suitable for cultivation in an aqueous nutrient fermentation medium under sterile conditions to grow and produce mushroom tissue. The fermentation medium is inoculated with the mushroom tissue and the mushroom tissue is cultivated using suitable procedures known to the art. Suitable inoculation techniques, nutrient media, and fermentation conditions for growing and producing mushroom tissue are described in the cited patent to Szuecs and the article by Sugihara et al. One particular advantage of the present invention is that the fermentation medium may be inoculated by mushroom tissue treated in accordance with the present invention by simply adding sections or pieces of the mushroom tissue directly to the fermentation medium.

The mushroom tissue may be recovered from the fermentation medium by any suitable procedure, as for example by centrifugation or filtration. If desired, the recovered mushroom tissue may then be dried by any suitable procedure, as for example by drum-drying or spray-drying techniques.

The mushroom product produced in accordance with the present invention has numerous uses. It can be used directly as a food or as a flavoring agent. For instance, soups of distinctive mushroom flavor can be prepared by cooking the mushroom product with water and a small amount of salt and pepper. If thicker soups are desired a thickening agent such as cornstarch or flour may be incorporated in the soup. The mushroom product may also be mixed with dried vegetables and a thickening agent and compressed into blocks or tablets which may be utilized as a convenient source for soup by reconstitution with water. The mushroom product can be used as a flavoring agent. For instance, the mushroom product in dry, powdered form can be sprinkled directly on steaks and chops or added to conventional gravies or sauces. The mushroom product may also be used as a feed for animals.

The term "edible mushroom" as used herein is taken to include any species or variety of palatable, non-toxic mushroom. Examples of such mushrooms include mushrooms of the following species: *Agaricus campestris, Cortinellus berkelycinus, Morchella hydrida* and *Morchella crassipes*. The term "mushroom tissue" as used herein means any living portion of the mushroom, including spores, the fleshy part of the fruiting body, or mycelia.

The invention will be more fully understood by reference to the following specific examples. It is understood that the examples are presented for purposes of illustration only and are not intended as a limitation of the invention. Although the examples herein show the growth and production of mushroom tissue of the species *Morchella crassipes*, it is obvious that other species of edible mushrooms can be utilized.

Example 1

Several mushrooms of the species *Morchella crassipes* were placed in an aqueous solution of sodium hypochlorite, having a concentration of 5.25% sodium hypochlorite for 45 seconds. The thus treated mushrooms were then washed with water which had been sterilized by boiling and cut into small pieces with a sterilized scalpel.

A fermentation medium was prepared from the following ingredients:

| | |
|---|---|
| Corn Steep Liquor _____grams__ | 70 |
| Urea _____do____ | 1 |
| Distilled water _____mls__ | 1000 |

100 mls. of the medium were placed in a 500 ml. shake flask. The flask was placed in a common household pressure cooker and the flask and its contents were sterilized under pressure at an elevated temperature. After sterilization the flask was removed from the pressure cooker and allowed to cool to room temperature. To the flask were then aseptically added several pieces of the sterilized mushroom tissue. The contents of the flask were then incubated with agitation for 5 days at 38° C. A dense growth of mushroom tissue was obtained in the 5-day incubation period.

Example 2

The procedure of Example 1 was repeated in all essential details with the exception that an aqueous solution of hydrogen peroxide having a concentration of hydrogen peroxide of 5.0% was utilized instead of the aqueous solution of sodium hypochlorite. A dense growth of mushroom tissue was obtained.

Example 3

The following example is offered to show the effect of treatment time on mushroom tissue treated with an aqueous solution of an oxidizing agent in accordance with the present invention.

Pieces of mushroom tissue from mushrooms of the species *Morchella crassipes* were placed in an aqueous solution of sodium hypochlorite having a concentration of 5.25% by weight sodium hypochlorite based on the weight of the solution for prescribed periods of time. The thus treated mushroom tissue were washed with distilled water which had been sterilized by boiling. The pieces of mushroom tissue were then divided into seven samples and each sample was individually cultivated on an aqueous nutrient medium of the composition of the medium of Example 1 under the same conditions as set forth in Example 1. The results obtained are given in the following table.

TABLE

| Sample | Treatment Time (sec.) | Contamination by Microorganisms | Growth of Mushroom Tissue |
|---|---|---|---|
| 1 | 10 | Substantial | Small amount of growth. |
| 2 | 20 | ___do___ | Do. |
| 3 | 30 | None | Abundant growth. |
| 4 | 45 | ___do___ | Do. |
| 5 | 60 | ___do___ | Do. |
| 6 | 75 | ___do___ | No growth. |
| 7 | 90 | ___do___ | Do. |

The above data illustrate that treatment of mushroom tissue with an aqueous solution of sodium hypochlorite having a concentration of sodium hypochlorite of 5.25% by weight for 20 seconds or less fails to sterilize the mushroom tissue against microorganisms. The above data also illustrates that treatment of mushroom tissue with an aqueous solution of sodium hypochlorite for 75 seconds or longer causes the mushroom tissue to be unsuitable for cultivation in an aqueous nutrient medium.

Since many embodiments may be made of this invention and since many changes may be made in the embodiments described, the foregoing is to be interpreted as illustrative only and the invention is defined by the appended claims.

I claim:

1. In an improved process for the growth and production of mushroom tissue by providing mushroom tissue, inoculating a sterile aqueous nutrient fermentation medium with said mushroom tissue and cultivating said mushroom tissue in said medium under sterile conditions, the improvement which comprises treating the said mushroom tissue prior to inoculation of the said sterile aqueous nutrient fermentation medium with an aqueous solution of an oxidizing agent selected from the group consisting of sodium hypochlorite and hydrogen peroxide, the time of said treatment and the concentration of said oxidizing agent in said solution being sufficient to sterilize the said mushroom tissue against contaminating microorganisms but limited to prevent substantial destruction of said mushroom tissue.

2. The process of claim 1 wherein the oxidizing agent is sodium hypochlorite.

3. The process of claim 2 wherein the concentration of said sodium hypochlorite is in the range of from about 3 to about 6% by weight based on the weight of the said aqueous solution.

4. The process of claim 3 wherein the time of treatment is in the range of from about 30 to about 60 seconds.

5. The process of claim 1 wherein the oxidizing agent is hydrogen peroxide.

6. The process of claim 5 wherein the concentration of said hydrogen peroxide is in the range of from about 3 to about 10% by weight based on the weight of the said aqueous solution.

7. The process of claim 5 wherein the time of treatment is in the range of from about 30 to about 60 seconds.

8. The process of claim 1 wherein the mushroom tissue is tissue of an edible mushroom of the genus *Morchella*.

References Cited
UNITED STATES PATENTS

| | | | |
|---|---|---|---|
| 2,850,841 | 8/1958 | Szuecs | 47—1.1 |
| 2,928,210 | 3/1960 | Cirillo et al. | 47—1.1 |
| 3,086,320 | 4/1963 | Heinemann | 47—1.1 |

ABRAHAM G. STONE, *Primary Examiner.*

R. E. BAGWILL, *Assistant Examiner.*